US011900779B2

(12) United States Patent
Kozel et al.

(10) Patent No.: US 11,900,779 B2
(45) Date of Patent: Feb. 13, 2024

(54) POWER DISTRIBUTION EQUIPMENT PERSONNEL SAFETY SYSTEM

(71) Applicant: ABB Schweiz AG, Baden (CH)

(72) Inventors: Tomas Kozel, Brno (CZ); Jiri Pokorny, Dolni Dunajovice (CZ); Marco Egman, Ponte San Pietro (IT); Callisto Gatti, Albino (IT); Bilal Sarfraz, Kamp-Lintfort (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/900,983

(22) Filed: Sep. 1, 2022

(65) Prior Publication Data

US 2023/0072474 A1 Mar. 9, 2023

(30) Foreign Application Priority Data

Sep. 2, 2021 (EP) .................................... 21194544

(51) Int. Cl.
*G08B 21/02* (2006.01)
*G08B 13/14* (2006.01)

(52) U.S. Cl.
CPC ........... *G08B 21/023* (2013.01); *G08B 21/02* (2013.01); *G08B 21/0277* (2013.01); *G08B 13/1427* (2013.01)

(58) Field of Classification Search
CPC ...... G08B 21/00; G08B 21/02; G08B 21/023; G08B 21/0277; G01R 31/52; G07C 9/00; G07C 9/00571; G07C 9/28; G07C 9/29; G07C 9/30; G06F 1/30; H01M 10/48;
(Continued)

(56) References Cited

U.S. PATENT DOCUMENTS

2009/0015400 A1 1/2009 Breed
2012/0112536 A1* 5/2012 Karalis .................. H02J 50/60 307/9.1

(Continued)

FOREIGN PATENT DOCUMENTS

CN 112864869 A 5/2021
EP 3359477 A1 8/2018

(Continued)

OTHER PUBLICATIONS

NPL Search (Jun. 9, 2023).*

(Continued)

*Primary Examiner* — Van T Trieu
(74) *Attorney, Agent, or Firm* — Leydig, Voit & Mayer, Ltd.

(57) ABSTRACT

A power distribution equipment personnel safety system includes a vicinity sensor and a power distribution equipment sensor. An outer envelope having a door or cover to an interior of the power distribution equipment is monitored by a vicinity sensor data and a processing unit determines a position of a person in the area outside of the door/cover using vicinity sensor data. When the outer envelope is disturbed where one or more doors or one or more covers are open or not correctly closed or one or more covers are removed, the processing unit determines a personnel safety state and at least one action comprising utilization of the personnel safety state.

15 Claims, 3 Drawing Sheets

(58) Field of Classification Search
CPC .. H02J 7/00; H02J 3/00; H02J 3/0075; H04W 52/267; H04W 52/346
See application file for complete search history.

(56) References Cited

U.S. PATENT DOCUMENTS

| | | | | |
|---|---|---|---|---|
| 2012/0112696 A1* | 5/2012 | Ikeda | H01M 10/48 320/109 |
| 2014/0250327 A1* | 9/2014 | Flynn | H02J 3/0075 714/22 |
| 2017/0069150 A1 | 3/2017 | Kim et al. | |
| 2018/0129276 A1 | 5/2018 | Nguyen et al. | |

FOREIGN PATENT DOCUMENTS

| | | |
|---|---|---|
| KR | 10-2020-0003439 A | 1/2020 |
| WO | WO 2017/062638 A1 | 4/2017 |
| WO | WO 2019/139874 A1 | 7/2019 |

OTHER PUBLICATIONS

Barcotec, "RealWear HMT-1Z1," downloaded from the Internet on Aug. 24, 2022, at https://realwear.at/en/hmt-1z1/, 2 pp. (2022).

Microsoft, "Hololens 2," downloaded from the Internet on Aug. 30, 2022, at https://www.microsoft.com/en-us/hololens/hardware, 11 pp. (2022).

European Patent Office, Extended European Search Report in European Patent Application No. 21194544.9, 21 pp. (dated Jul. 4, 2022).

* cited by examiner

POWER DISTRIBUTION EQUIPMENT PERSONNEL SAFETY SYSTEM

CROSS-REFERENCE TO RELATED APPLICATIONS

This patent application claims priority to European Patent Application No. 21194544.9, filed on Sep. 2, 2021, which is incorporated herein in its entirety by reference.

FIELD OF THE DISCLOSURE

The present disclosure relates to personnel safety systems for power distribution equipment or systems such as low, medium or high voltage switchgear, and to low, medium or high voltage switchgears, transformers, distribution boards, variable speed drives, uninterruptible power supplies, or any other enclosed equipment.

BACKGROUND OF THE INVENTION

The safety of personnel in electrical substations containing power distribution equipment such as switchgears, transformers, distribution boards, variable speed drives, UPSs etc. (further Power Distribution Equipment) is ensured by the equipment design and specific safety procedures. The safety procedures are archived in written form and the personnel are trained for the safe operation and maintenance of the power equipment including the safety aspects described in the procedures.

The level of adoption of the safety procedures into the daily work routines then depends on many aspects, such as Frequency and intensity of the training, Level of understanding of the safety procedures, Compliance of personnel to the procedures, Level of supervision and reviews by safety officers and superiors, and the like.

However, different levels of observance and adherence and adoption of the safe working practices and procedures are observed in practical day-to-day situations, resulting in "safety" incidents if the adoption is poor.

BRIEF SUMMARY OF THE INVENTION

Therefore, it would be advantageous to have improved personnel safety systems for power distribution equipment or systems.

In a first aspect, there is provided a power distribution equipment personnel safety system, comprising: a power distribution equipment; a processing unit; at least one vicinity sensor; and at least one power distribution equipment sensor.

The power distribution equipment comprises an outer envelope. The outer envelope comprises at least one door configured to permit access to an interior of the power distribution equipment and/or the outer envelope comprises at least one cover configured to permit access to the interior of the power distribution equipment. The at least one vicinity sensor is configured to acquire vicinity sensor data in an area outside of the outer envelope of the power distribution equipment, and provide the vicinity sensor data to the processing unit. The processing unit is configured to determine a position of a person in the area outside of the outer envelope of the power distribution equipment, the determination comprising utilization of the vicinity sensor data.

The at least one power distribution equipment sensor is configured to acquire status data of the outer envelope of the power distribution equipment and provide the status data to the processing unit. The processing unit is configured to utilize the status data to determine whether the power distribution equipment outer envelope is undisturbed where the at least one door and/or the at least one cover are correctly closed or whether the outer envelope is disturbed where one or more doors or one or more covers are open or not correctly closed or one or more covers are removed. The processing unit is configured to determine a personnel safety state, the determination comprising utilization of the position of the person in the area outside of the outer envelope of the power distribution equipment and whether the power distribution equipment outer envelope is undisturbed or whether the outer envelope is disturbed. The processing unit is configured to determine at least one action comprising utilization of the personnel safety state.

BRIEF DESCRIPTION OF THE SEVERAL VIEWS OF THE DRAWING(S)

DETAILED DESCRIPTION OF THE INVENTION

Figure 1:
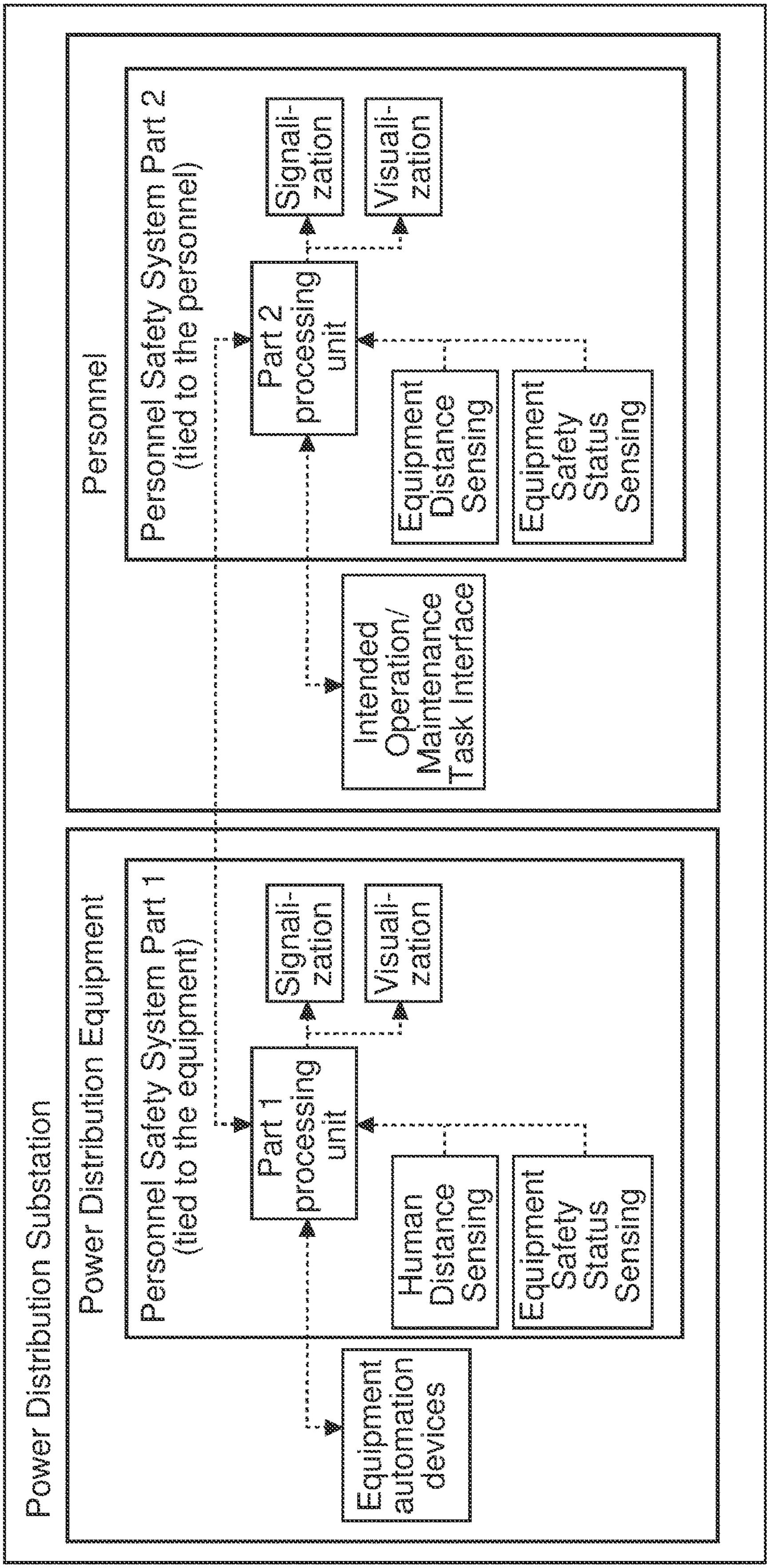
FIG. 1 shows an example of an overall Personnel Safety System architecture in accordance with the disclosure.
Figure 2:
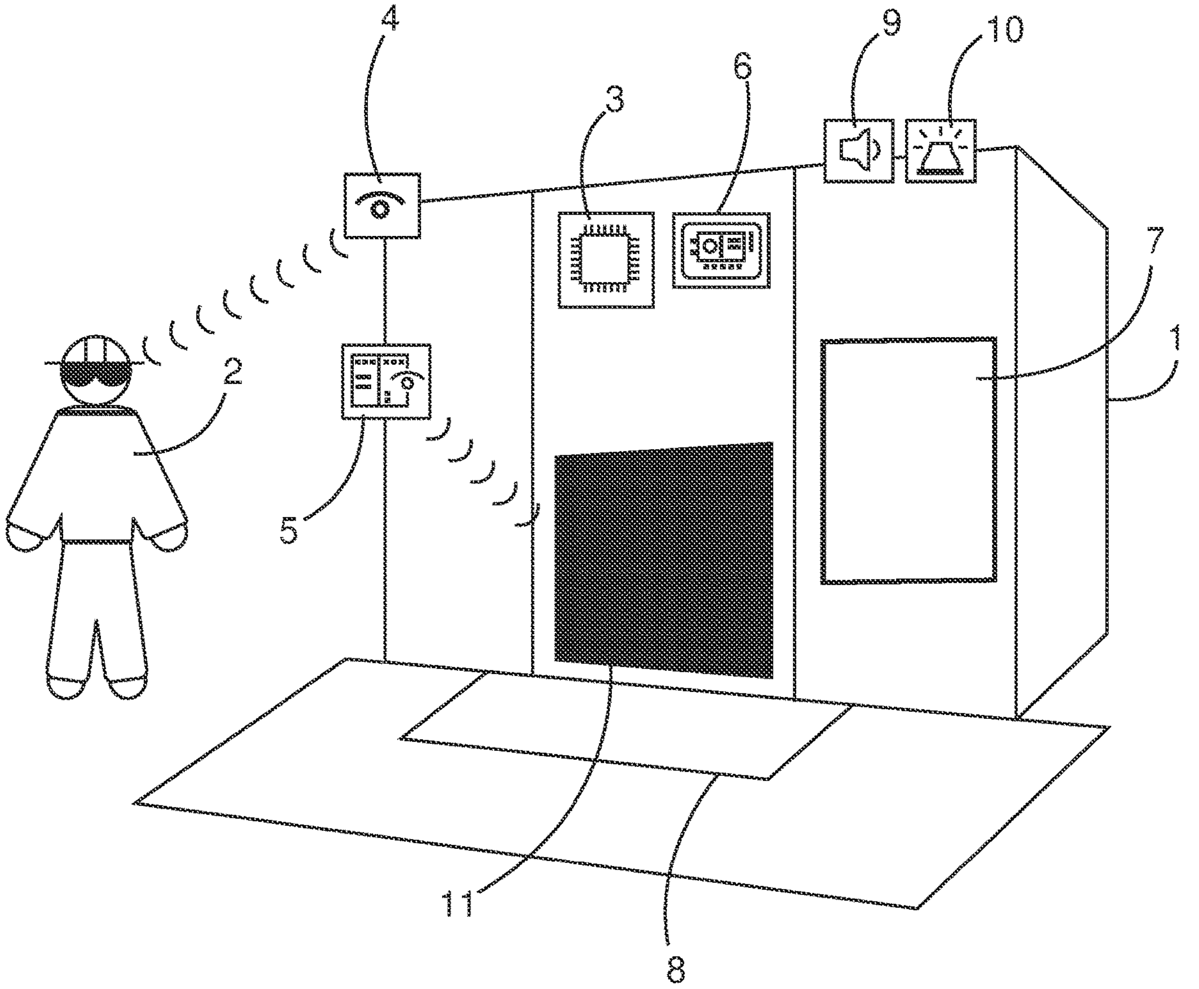
FIG. 2 shows an example of a personnel safety system tied to the equipment in accordance with the disclosure.
Figure 3:
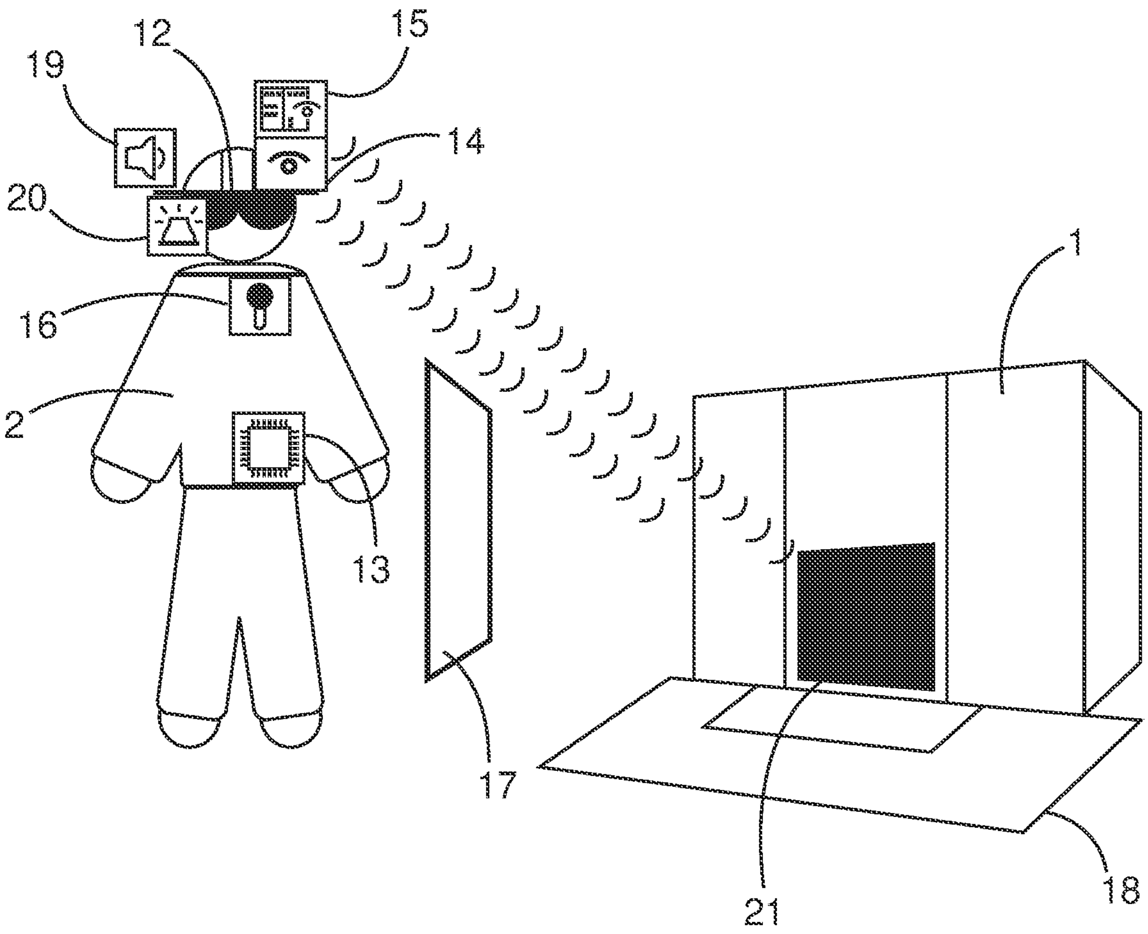
FIG. 3 shows an example of a personnel safety system tied to the person in accordance with the disclosure.

FIGS. 1-3 relate to power distribution equipment personnel safety systems and a personal protection equipment system for power distribution equipment.

In an example, a power distribution equipment personnel safety system comprises: a power distribution equipment 1; a processing unit 3; at least one vicinity sensor 4; and at least one power distribution equipment sensor 5. The power distribution equipment comprises an outer envelope. The outer envelope comprises at least one door configured to permit access to an interior of the power distribution equipment and/or wherein the outer envelope comprises at least one cover configured to permit access to the interior of the power distribution equipment. The at least one vicinity sensor is configured to acquire vicinity sensor data in an area outside of the outer envelope of the power distribution equipment, and provide the vicinity sensor data to the processing unit. The processing unit is configured to determine a position of a person in the area outside of the outer envelope of the power distribution equipment, the determination comprising utilization of the vicinity sensor data.

The at least one power distribution equipment sensor is configured to acquire status data of the outer envelope of the power distribution equipment and provide the status data to the processing unit. The processing unit is configured to utilize the status data to determine whether the power distribution equipment outer envelope is undisturbed where the at least one door and/or the at least one cover are correctly closed or whether the outer envelope is disturbed where one or more doors or one or more covers are open or not correctly closed or one or more covers are removed. The processing unit is configured to determine a personnel safety state, the determination comprising utilization of the position of the person in the area outside of the outer envelope of the power distribution equipment and whether the power distribution equipment outer envelope is undisturbed or whether the outer envelope is disturbed. The processing unit is configured to determine at least one action comprising utilization of the personnel safety state.

In an example, the power distribution equipment is a switchgear, transformer, distribution board, variable speed drive, uninterruptible power supply, or any other enclosed equipment.

In an example, the processing unit is comprised within the power distribution equipment.

In an example, the processing unit is separate to the power distribution equipment.

In an example, the at least one vicinity sensor is located on the outer envelope.

In an example, the at least one vicinity sensor is separated from the outer envelope.

In an example, the at least one vicinity sensor comprises a camera system and/or a radar system and/or a system using Light Detection and Ranging (lidar).

In an example, the determined position of the person in the area outside of the outer envelope of the power distribution equipment comprises a distance the person is spaced from the outer envelope.

According to an example, the determination of the position of the person in the area outside of the outer envelope of the power distribution equipment comprises utilization by the processing unit of an image processing algorithm to identify a person.

According to an example, the processing unit is configured to implement an image processing algorithm to process the vicinity sensor data to determine whether the person has at least one work item or not, and wherein the determination of the action comprises utilization of whether the person has the work item or not.

According to an example, the at least one power distribution equipment sensor comprises one or more of limit switches, proximity sensors, position sensors, cameras.

According to an example, the personnel safety state comprises one of: a) the equipment outer envelope is undisturbed and no person is detected, b) the equipment outer envelope is undisturbed and a person is detected within a distance X, c) the outer envelope is disturbed and no person is detected within the distance X, d) the outer envelope is disturbed and a person is detected to have just entered a vicinity of the power distribution equipment, e) the outer envelope is disturbed and a person is detected to be within the distance X, f) the outer envelope is disturbed and a person has been detected to have just left the vicinity of the power distribution equipment, g) the outer envelope is disturbed and no person is detected and at least one work item is detected within the distance X that was brought in by a person and the person is not detected for a duration$<$T.

According to an example, the at least one determined action comprises one or more of: A) engagement of additional power distribution equipment protection in the case where the personnel safety state is d) or e); B) visualization of a safe indication in the case where the personnel safety state is a) or b), visualization of a danger indication in the case where the personnel safety state is c), d), e), or f); C) an indication on the floor of at least one safe zone in the area outside of the envelope in the case where the personnel safety state is c), d), e), or f) and/or an indication of personnel protection equipment to be worn in each zone in the area outside of the envelope in the case where the personnel safety state is c), d), e), or f), and/or an indication of a location of the disturbance in the outer envelope in the case where the personnel safety state is c), d), e), or f); D) signalization to warn of approaching or leaving the power distribution equipment that is in an unsafe state in the case where the personnel safety state is d) or f).

In an example a personal protection equipment system for power distribution equipment comprises: personal protection equipment 12; a processing unit 13; at least one vicinity sensor 14 integrated with or attached to the personal protection equipment; at least one power distribution equipment sensor 15 integrated with or attached to the personal protection equipment; and a user interface 16 integrated with or attached to the personal protection equipment. The personal protection equipment is configured to be worn by a person. The at least one vicinity sensor is configured to acquire vicinity sensor data in an area outside of an outer envelope of a power distribution equipment, and provide the vicinity sensor data to the processing unit. The outer envelope comprises at least one door configured to permit access to an interior of the power distribution equipment and/or the outer envelope comprises at least one cover configured to permit access to the interior of the power distribution equipment. The processing unit is configured to determine a position of a person wearing the personal protection equipment in the area outside of the outer envelope of the power distribution equipment, the determination comprising utilization of the vicinity sensor data. The at least one power distribution equipment sensor is configured to acquire status data of the outer envelope of the power distribution equipment and provide the status data to the processing unit. The processing unit is configured to utilize the status data to determine whether the power distribution equipment outer envelope is undisturbed where the at least one door and/or the at least one cover are correctly closed or whether the outer envelope is disturbed where one or more doors or one or more covers are open or not correctly closed or one or more covers are removed. The user interface is configured to enable the person to enter intended task information relating to the power distribution equipment and provide the task information to the processing unit. The processing unit is configured to determine on the basis of the intended task information whether the power distribution equipment outer envelope is expected to be undisturbed where the at least one door and/or the at least one cover are correctly closed or whether the outer envelope is expected to be disturbed where one or more doors and/or one or more covers are open or one or more covers are removed. The processing unit is configured to determine a personnel safety state, the determination comprising utilization of the position of the person in the area outside of the outer envelope of the power distribution equipment and whether the power distribution equipment outer envelope is undisturbed or whether the outer envelope is disturbed and whether the power distribution equipment outer envelope is expected to be undisturbed or whether the outer envelope is expected to be disturbed. The processing unit is configured to determine at least one action comprising utilization of the personnel safety state.

In an example, the personal protection equipment comprises a head-up display 17 and/or an extended reality display system 18.

In an example, the personal protection equipment comprises a siren 19.

In an example, a siren 19 is separate to the personal protection equipment.

In an example, the system comprises a visual indication system 20.

In an example, the power distribution equipment is a switchgear, transformer, distribution board, variable speed drive, uninterruptible power supply, or any other enclosed equipment.

In an example, the processing unit is integrated with or attached to the personal protection equipment.

In an example, the processing unit is separate to the personal protection equipment.

In an example, the at least one vicinity sensor comprises a camera system and/or a radar system and/or a lidar system.

In an example, the at least one power distribution equipment sensor comprises a camera system and/or a radar system and/or a lidar system.

In an example, the at least one power distribution equipment sensor is the at least one vicinity sensor.

According to an example, the personal protection equipment comprises a head-up display 17 and/or extended reality display system 18, and wherein the processing unit is configured display a representation of the power distribution equipment on the head-up display and/or the extended reality display comprising utilization of the vicinity sensor data.

According to an example, the personal protection equipment comprises a head-up display 17 and/or extended reality display system 18 and wherein the processing unit is configured to display information about the power distribution equipment on the head-up display and/or the extended reality display comprising utilization of the vicinity sensor data.

According to an example, the information about the power distribution equipment comprises one or more of equipment type, equipment designation, short circuit current levels of the equipment, safe operating and troubleshooting instructions.

According to an example, the processing unit is configure to implement an image processing algorithm to process the status data of the outer envelope of the power distribution equipment to determine one or more of: the at least one door is closed, the at least one door is correctly closed, the at least one cover is closed, the at least one cover is correctly closed, one or more doors are open, one or more covers are open, one or more doors are not correctly closed, one or more covers are not correctly closed, and one or more covers are removed.

According to an example, the personnel safety state comprises one of: m) the equipment outer envelope is undisturbed and a person is not intending to operate or maintain the power distribution equipment, n) the equipment outer envelope is undisturbed and a person is detected within a distance Y and the intended operation is not intended to disturb the outer envelope, o) the equipment outer envelope is undisturbed and a person is detected within a distance Y and the intended operation is intended to disturb the outer envelope, p) the outer envelope is disturbed and a person is not intending to operate or maintain the power distribution equipment, q) the outer envelope is disturbed and a person is detected within a distance Y and the intended operation is not intended to disturb the outer envelope, r) the outer envelope is disturbed and a person is detected within a distance Y and the intended operation is intended to disturb the outer envelope.

According to an example, the at least one determined action comprises one or more of: M) Visualization via the head-up display and/or the extended reality display system of a safe indication in the case where the personnel safety state is m) or n), visualization via the head-up display and/or the extended reality display system of a danger indication in the case where the personnel safety state is o), p), q) or r); N) Visualization via the head-up display and/or the extended reality display system an indication on the floor of at least one safe zone in the area outside of the envelope in the case where the personnel safety state is o), p), q), or r) and/or an indication of personnel protection equipment to be worn in each zone in the area outside of the envelope in the case where the personnel safety state is o), p), q), or r), and/or an indication of a location of the disturbance in the outer envelope in the case where the personnel safety state is o), p), q), or r); O) signalization to warn of approaching or leaving the power distribution equipment that is in an unsafe state in the case where the personnel safety state is p) or q); P) Visualization via the head-up display and/or the extended reality display system of instructions for performing an intended operation or maintenance task and/or instructions for troubleshooting an envelope disturbance in the case where the personnel safety state is o), p), q) or r); Q) recording of the vicinity sensor data and/or status data in the case where the personnel safety state is o), p), q) or r).

In an example, a power distribution equipment personnel safety system comprises: a power distribution equipment 1; personal protection equipment 12; a processing unit 3, 13; at least one first vicinity sensor 4 located on the power distribution equipment and/or at a fixed location separate from the power distribution equipment; at least one second vicinity sensor 14 integrated with or attached to the personal protection equipment; at least one first power distribution equipment sensor 5 located in the power distribution equipment and/or at a fixed location separate from the power distribution equipment, and wherein the at least one first power distribution equipment sensor comprises one or more of limit switches, proximity sensors, position sensors, cameras; at least one second power distribution equipment sensor 15 integrated with or attached to the personal protection equipment; and a user interface 16 integrated with or attached to the personal protection equipment. The power distribution equipment comprises an outer envelope. The outer envelope comprises at least one door configured to permit access to an interior of the power distribution equipment and/or wherein the outer envelope comprises at least one cover configured to permit access to the interior of the power distribution equipment. The personal protection equipment is configured to be worn by a person. The at least one first vicinity sensor is configured to acquire first vicinity sensor data in an area outside of the outer envelope of the power distribution equipment, and provide the first vicinity sensor data to the processing unit. The at least one second vicinity sensor is configured to acquire second vicinity sensor data in the area outside of the outer envelope of the power distribution equipment, and provide the first vicinity sensor data to the processing unit. The processing unit is configured to determine a position of the person in the area outside of the outer envelope of the power distribution equipment, the determination comprising utilization of the first vicinity sensor data and the second vicinity data. The at least one first power distribution equipment sensor is configured to acquire status data of the outer envelope of the power distribution equipment and provide the status data to the processing unit. The at least one second power distribution equipment sensor is configured to acquire status data of the outer envelope of the power distribution equipment and provide the status data to the processing unit. The processing unit is configured to utilize the first status data and the second status data to determine whether the power distribution equipment outer envelope is undisturbed where the at least one door and/or the at least one cover are correctly closed or whether the outer envelope is disturbed where one or more doors or one or more covers are open or not correctly closed or one or more covers are removed. The user interface is configured to enable the person to enter intended task information relating to the power distribution equipment and provide the task information to the processing unit. The processing unit is configured to determine on the basis of the intended task information whether the power distribution equipment outer envelope is expected to be undisturbed where the at least one door and/or the at least one cover are correctly closed or whether the outer envelope is expected to be disturbed where one or more doors and/or one or more covers are open or one or more covers are removed. The processing unit is configured to determine a personnel safety state, the determination comprising utilization of the position of the person in the area outside of the outer envelope of the power distribution equipment and whether the power distribution equipment outer envelope is undisturbed or whether the outer envelope is disturbed and whether the power distribution equipment outer envelope is expected to be undisturbed or whether the outer envelope is expected to be disturbed. The processing unit is configured to determine at least one action comprising utilization of the personnel safety state.

According to an example, the personal protection equipment comprises a head-up display 17 and/or extended reality display system 18. The processing unit is configured to display a representation of the power distribution equipment on the head-up display and/or the extended reality display comprising utilization of the vicinity sensor data.

In an example, the processing unit is configured to display information about the power distribution equipment on the head-up display and/or the extended reality display comprising utilization of the vicinity sensor data.

In an example, the information about the power distribution equipment comprises one or more of equipment type, equipment designation, short circuit current levels of the equipment, safe operating and troubleshooting instructions.

In an example, the determination of the position of the person in the area outside of the outer envelope of the power distribution equipment comprises utilization by the processing unit of an image processing algorithm to identify a person.

In an example, the processing unit is configured to implement an image processing algorithm to process the first vicinity sensor data to determine whether the person has at least one work item or not. The determination of the action can then comprise utilization of whether the person has the work item or not.

In an example, the processing unit is configure to implement an image processing algorithm to process the second status data of the outer envelope of the power distribution equipment and utilize the first status data and the processed second status data to determine one or more of: the at least one door is closed, the at least one door is correctly closed, the at least one cover is closed, the at least one cover is correctly closed, one or more doors are open, one or more covers are open, one or more doors are not correctly closed, one or more covers are not correctly closed, and one or more covers are removed.

In an example, the personnel safety state comprises one of: a) the equipment outer envelope is undisturbed and no person is detected, b) the equipment outer envelope is undisturbed and a person is detected within a distance X, c) the outer envelope is disturbed and no person is detected within the distance X, d) the outer envelope is disturbed and a person is detected to have just entered a vicinity of the power distribution equipment, e) the outer envelope is disturbed and a person is detected to be within the distance X, f) the outer envelope is disturbed and a person has been detected to have just left the vicinity of the power distribution equipment, g) the outer envelope is disturbed and no person is detected and at least one work item is detected within the distance X that was brought in by a person and the person is not detected for a duration<T.

In an example, the at least one determined action comprises one or more of: A) engagement of additional power distribution equipment protection in the case where the personnel safety state is d) or e); B) visualization of a safe indication in the case where the personnel safety state is a) or b), visualization of a danger indication in the case where the personnel safety state is c), d), e), or f); C) an indication on the floor of at least one safe zone in the area outside of the envelope in the case where the personnel safety state is c), d), e), or f) and/or an indication of personnel protection equipment to be worn in each zone in the area outside of the envelope in the case where the personnel safety state is c), d), e), or f), and/or an indication of a location of the disturbance in the outer envelope in the case where the personnel safety state is c), d), e), or f); D) signalization to warn of approaching or leaving the power distribution equipment that is in an unsafe state in the case where the personnel safety state is d) or f).

In an example, the personnel safety state comprises one of: m) the equipment outer envelope is undisturbed and a person is not intending to operate or maintain the power distribution equipment, n) the equipment outer envelope is undisturbed and a person is detected within a distance Y and the intended operation is not intended to disturb the outer envelope, o) the equipment outer envelope is undisturbed and a person is detected within a distance Y and the intended operation is intended to disturb the outer envelope, p) the outer envelope is disturbed and a person is not intending to operate or maintain the power distribution equipment, q) the outer envelope is disturbed and a person is detected within a distance Y and the intended operation is not intended to disturb the outer envelope, r) the outer envelope is disturbed and a person is detected within a distance Y and the intended operation is intended to disturb the outer envelope.

In an example, the at least one determined action comprises one or more of: M) Visualization via the head-up display and/or the extended reality display system of a safe indication in the case where the personnel safety state is m) or n), visualization via the head-up display and/or the extended reality display system of a danger indication in the case where the personnel safety state is o), p), q) or r); N) Visualization via the head-up display and/or the extended reality display system an indication on the floor of at least one safe zone in the area outside of the envelope in the case where the personnel safety state is o), p), q), or r) and/or an indication of personnel protection equipment to be worn in each zone in the area outside of the envelope in the case where the personnel safety state is o), p), q), or r), and/or an indication of a location of the disturbance in the outer envelope in the case where the personnel safety state is o), p), q), or r); O) signalization to warn of approaching or leaving the power distribution equipment that is in an unsafe state in the case where the personnel safety state is p) or q); P) Visualization via the head-up display and/or the extended reality display system of instructions for performing an intended operation or maintenance task and/or instructions for troubleshooting an envelope disturbance in the case where the personnel safety state is o), p), q) or r); Q) recording of the vicinity sensor data and/or status data in the case where the personnel safety state is o), p), q) or r).

The personnel safety in the electrical substations containing power distribution equipment is influenced by many aspects—level of understanding and compliance to the safety procedures being one of the most important ones.

The power distribution equipment personnel safety systems and personal protection equipment system for power distribution equipment as described above have redundancy that ensures the visualization of safety related aspects for the personnel in an understandable and easy to follow form. This results in increasing the level of understanding of the safety procedures and leads to decreasing the safety incident numbers and severity.

The power distribution equipment personnel safety systems and a personal protection equipment system for power distribution equipment are now described in specific detail in relation to specific embodiments, where reference is again made to FIGS. 1-3.

The Personnel Safety System supports the adoption of safety procedures in the operation and maintenance of Power Distribution Equipment. By deploying such a system, the influence of problems as described above are minimized and all personnel are enabled to have the same understanding of the safety procedures and follow the same routines containing the safety best practice.

The Personnel Safety System has two parts, the first part of the system being tied to the Power Distribution Equipment and the second part of the system being tied to the person—also referred here to as personnel. These two parts complement each other and they can work independently, meaning only one part can be implemented at certain cases, or they can be implemented both working independently without any data sharing or they can be implemented both and work in orchestration sharing certain data.

The first part of the Personnel Safety System tied to the equipment consists of sensors, data analysis and a feedback loop in the form of signals routed to the equipment and data visualization for the personnel. The main task of this part is the detection of personnel proximity (distance) to the equipment, detection of personnel safety status of the equipment and taking action based on the collected information. When detecting personnel approaching the equipment or unsafe equipment status, the system can engage or switch on dedicated safety devices or settings, that would improve personnel safety while keeping the power distribution uninterrupted. At the same time it can switch on signalization and/or visualization of the personnel safety status. The visualization can include an explanation of what needs to be done to mitigate the risks—for example what Personal Protective Equipment (PPE) has to be worn or what unsafe condition is detected.

The second part of the Personnel Safety System ties to the personnel. Having a form of smart PPE (for example smart safety glasses) with head up display or extended reality display, it can work with personnel distance to the equipment (measured this time from the personnel towards the equipment) displaying the safety information derived from that distance—for example the proximity of equipment the personnel should be aware of to avoid accidental touching or PPE prescribed for work on certain equipment after opening doors or covers. This part of the system can also provide step by step guidance for performing certain operations or maintenance tasks in a safe manner, guiding the personnel with instructions on the head up display or in extended reality in performing the task safely.

As detailed above, the Personnel Safety System consists of two parts that can operate independently or together. The overall architecture is shown on FIG. 1

Part 1 and Part 2 of the system can work in cooperation sharing the data, or they can work independently without the connection depicted in the long dash two dots line shown in FIG. 1. However, each part of the system can work independently of the other one, which creates inherent redundancy. Each part can even be deployed independently (without the other part).

Personnel Safety System Part 1—Tied to the Equipment

The part of the system tied to the equipment can be located on the equipment itself and consists of following components as shown in FIG. 2.

The box in the center of FIG. 2 represents a power distribution equipment 1 such as switchgear, transformer, distribution board, variable speed drive, UPS or any other enclosed equipment. The Part 1 Processing Unit 3 is preferably a compact industrial computer with computing power sufficient for handling the inputs from sensors and the associated monitoring tasks. Using an industrial computer with Image recognition (in more general machine learning or artificial intelligence) capabilities can be advantageous here. The Part 1 Processing Unit 3 is located inside the equipment 1 in the auxiliary compartment or box that is typically part of such equipment.

However, different options exist:

Different option: The Part 1 Processing Unit (3) might be also part of a bigger equipment centralized computer, that has other tasks than the Personnel Safety tasks—for example centralized control and protection.

Different option: The Part 1 Processing Unit (3) might be computation system consisting of an edge and cloud parts. The edge part would be responsible for data collection, pre-processing and computationally non-heavy tasks, while the cloud part would be responsible for the heavy computational tasks.

The Human Distance Sensing 4 is located on the outer surface or holders attached to the power distribution equipment 1. The sensing is preferably in form of visual cameras directed to monitor the vicinity of the power distribution equipment. The cameras field of view is such, that the human personnel 2 presence in an area near the equipment is detected and the personnel position with respect to the equipment can be retrieved with an accuracy that can for example be—minimum in tens of centimeters. The camera streams are transferred to the Part 1 Processing Unit 3, where the image recognition models recognize the human presence and the distance to the equipment. The presence and distance of the human personnel from the equipment can then be further considered in the Personnel Safety System calculations.

However, additional options exist:

Additional option: Human Distance Sensing 4 can include image recognition of certain items brought in by the personnel. A toolbox for example means a maintenance work is going to be performed, insulation resistance tester means a testing work is going to be performed.

The Equipment Safety Status Sensing 5 can be realized as one device or combination of several devices from the list below:

end position detection (limit switches, proximity sensors, position sensors) located inside the equipment 1.

visual cameras (these can be the same cameras as 4) on the outer surface or holders attached to the power distribution equipment 1.

The Equipment Safety Status Sensing 5 main task is the detection of the status of the equipment 1 outer envelope, that is providing arc proof containment of the equipment and/or a barrier to live parts of the equipment. Any disturbance 11 to the integrity of the outer envelope (both intentional as well as unintentional) can be detected and considered in further Personnel Safety System calculations. The intentional disturbance of the envelop is for example that relating to a cover, that was removed for performing a maintenance job leaving an opening in the envelope 11. An unintentional disturbance is for example that relating to an equipment door, that seems to be closed in its final position but the door closing was not finished properly leaving a weak spot in the envelope.

Additional options exist:

Additional option: Equipment Safety Status Sensing 5 can use the inputs from monitoring and diagnostic system, if that includes the envelope status sensing (for example doors are properly closed confirmation). The information from the monitoring and diagnostic system can be complemented with other information, that the monitoring and diagnostic system doesn't monitor (for example rear cover properly closed confirmation).

The Part 1 Processing Unit (3) then decides based on the analysis of inputs from Human Distance sensing (4) and Equipment Safety Status Sensing (5) on following personnel safety states:

- the equipment outer envelope is undisturbed and no personnel is around
- the equipment outer envelope is undisturbed and the personnel is in distance X
- the equipment envelope is disturbed and there is no personnel around
- the equipment envelope is disturbed and the personnel just entered the equipment vicinity
- the equipment envelope is disturbed and the personnel is in distance X
- the equipment envelope is disturbed and the personnel just left the equipment vicinity As an additional option, the equipment envelope is disturbed, some items brought in by the personnel are still detected but presence of personnel is not detected for duration<T.

The outputs of the Part 1 Processing Unit 3 are then depending on the calculated state. The outputs of the Part 1 Processing Unit 3 comprises one or any combination of following actions: Signalization of the personnel safety state to Equipment Automation Devices 6 such as protection relays, control relays, remote IOs or remote terminal units of the distributed control system or electrical network monitoring system etc. The system would be set to increase the personnel safety by engaging additional protection in case the state is d) or e). The additional protection might be a dedicated personnel safety device (for example Ultra Fast Earthing Switch) or a dedicated setting (for example sensitive setting of overcurrent protection). The engagement of the additional protection shall be signaled back to Part 1 Processing Unit 3, that shall consider the additional protection in the calculation of the Personnel Safety status and in visualization and signalization. The additional protection would be engaged in the situations d) and e) and would be disengaged in all other situations.

Visualization of the personnel safety state on the equipment faceplate 7, where information of the status can be accompanied with information about risk mitigation. The status a) and b) would be visualized as "safe", while statuses c), d), e) and f) would be visualized as "danger" with the indication of area, where the outer envelope of the equipment is disturbed and indication of arc flash PPE that should be worn by the personnel in the detected distance X. The technology used for visualization can take form of a display or the information can be projected on suitable part of equipment faceplate.

Visualization of the personnel safety state on the floor 8, where information of the status can be visualized in form of safety zones and accompanied with information about risk mitigation. The status a) and b) would be visualized as "safe" with no safety zones depicted, while statuses c), d), e) and f) would be visualized as "danger" with the indication of arc flash zones around the disturbance on the equipment envelope, indication of location of the outer envelope disturbance and PPE that should be worn by the personnel in each zone. The visualization would be preferably using on-floor projection technology. The visualization of state d) and f) might include a visual siren (in form of pulsating "warning" visuals) to stress to the personnel, that the equipment is in unsafe state.

Signalization of the safety status can be either given in the form of sound 9 signalization (for example a sound siren) or in form of visual signalization 10 for example an optical siren. The signalization would be triggered in states d) or f) to warn the personnel about approaching or leaving the equipment in unsafe state. The signalization is integrated in the equipment 1 or located on the outer surface or holders attached to the power distribution equipment.

As an additional option, if state g) is recognized, the signalization can be suppressed as the expectation is the personnel left the vicinity of the equipment but will return soon to continue the job. If the personnel doesn't return before the preset time T expires, the signalization is reactivated.

Personnel Safety System Part 2—tied to the personnel

The part of the system tied to the personnel would be located on the smart PPE and consist of following components as shown in FIG. 3.

The human shaped figure on the left-hand side of FIG. 3 represents the human personnel 2 wearing smart Personal Protective Equipment (PPE) 12. The Part 2 Processing Unit 13 is preferably a wearable electronic with computing power sufficient for handling the inputs from sensors and the associated monitoring and visualization tasks. The Part 2 Processing Unit 13 is preferably indivisible and embedded part of the smart PPE 12 or alternatively it might be a separate pocketsize electronic device connected with the smart PPE with wired or wireless connection line. The eyewear headsets available on market with necessary industrial certification such as RealWear HMT-1, Microsoft HoloLens 2 or any other with tailored made software can for example be used for this application as smart PPE 12.

As a different option, the Part 2 Processing Unit 13 can be a computation system consisting of an edge and cloud parts. The edge part would be embedded in the smart PPE 12 and it would be responsible for data collection, pre-processing and computationally non-heavy tasks, while the cloud part would be responsible for the heavy computational tasks.

The Equipment Distance Sensing 14 is preferably set of sensors embedded in the smart PPE 12 that allows spatial mapping and understanding of the 3D space in the field of view of the personnel. The power distribution equipment 1, that is in the real life bounded by the outer enclosure is in the virtual 3D space map represented by a virtual mass of the same size, that carries additional information such as equipment type, equipment designation, short circuit current levels of the equipment, image recognition models for detection of the Equipment Safety Status (for example models for image recognition of the integrity of the equipment outer envelope) and log of the last Equipment Safety Status as minimum. The safe operating and troubleshooting instructions can be part of the additional information as well. The Equipment Distance Sensing 14 output is distance from the personnel to the equipment with accuracy in tens of centimeters or better, that is then further used in the Personnel Safety System calculations.

The Equipment Safety Status Sensing 15 can be preferably provided by an optical camera or cameras and associated image recognition models. The Equipment Safety Status Sensing 15 can recognize the status of the outer equipment envelope integrity—for example if some covers or door on the equipment are opened leaving opening in the outer enclosure 21, the Equipment Safety Status Sensing can detect it and provide this information to the Part 2 Processing Unit 13. Preferably both intentional and unintentional envelope disturbances should be recognized. Subtle disturbance recognition (for example door closed but the door handle not in final closed position) can be hard to achieve or very much dependent on the location of the personnel with respect to the disturbance, however when Part 1 is also interacting with Part 2, then switches, or relays can be used to detect that a door is not correctly closed.

Any detected disturbance to the integrity of the outer envelope can then be considered in further Personnel Safety System calculations.

The personnel 2 can interact with the Part 2 Processing Unit 13 using the Intended Operation/Maintenance Task Interface 16. The communication can take form of one or any combination of following methods:

- Natural voice input—the Intended Operation/Maintenance Task Interface 16 then consist of microphone and natural language processing
- Pre-programmed voice commands—the Intended Operation/Maintenance Task Interface 16 then consist of microphone, visualization of available tasks and commands recognition.
- Hand and/or head gestures and movement—the Intended Operation/Maintenance Task Interface 16 then consist of gestures and movement recognition and visualization of available tasks The personnel 2 specifies what task he is going to perform on the equipment using the Intended Operation/Maintenance Task Interface 16. The main information derived from this input would be, whether the task the personnel is going to perform involves any intentional disturbance to the envelope of the equipment.

The Intended Operation/Maintenance Task information about intended disturbance to the envelope is then processed in the Personnel Safety System calculations.

The Part 2 Processing Unit 13 then decides based on the analysis of inputs from Equipment Distance Sensing 14, Equipment Safety Status Sensing 15 and the Intended Operation/Maintenance Task Interface 16 information on following personnel safety states:

- the equipment outer envelope is undisturbed and the personnel is walking by not intending to operate or maintain the equipment
- the equipment outer envelope is undisturbed, the personnel is in distance Y and the intended operation will not disturb the equipment envelope
- the equipment outer envelope is undisturbed, the personnel is in distance Y and the intended operation will disturb the equipment envelope
- the equipment envelope is disturbed and the personnel is walking by not intending to operate or maintain the equipment
- the equipment envelope is disturbed, the personnel is in distance Y and intends to work on the equipment on the task that doesn't involve intentional envelope disturbance
- the equipment envelope is disturbed, the personnel is in distance Y and intends to work on the equipment on the task that involves intentional envelope disturbance The outputs of the Part 2 Processing Unit 13 are then depending on the calculated state. The outputs of the Part 1 Processing Unit 13 comprises one or any combination of following actions:

- Visualization of the personnel safety state on the head up display 17, where information of the status can be accompanied with information about risk mitigation. The status m) and n) would be visualized as "safe", while statuses o), p), q) and r) would be visualized as "danger" with the indication of area, where the outer envelope of the equipment is disturbed and indication of PPE that should be worn by the personnel in the detected distance Y. The technology used for visualization can take form of a head up display or the information can take form of virtual screen in the space in field of view of the personnel 2.
- Visualization of the personnel safety state on the floor or in the 3D space 18, where information of the status can be visualized in form of safety zones and accompanied with information about risk mitigation. The status m) and n) would be visualized as "safe" with no safety zones depicted, while statuses o), p), q) and r) would be visualized as "danger" with the indication of arc flash zones around the disturbance on the equipment envelope, indication of location of the outer envelope disturbance and PPE that should be worn by the personnel in each zone. The visualization would be preferably using augmentation displaying in the 3D space directly in the place of use. The visualization of state p) and q) might include a visual siren (in form of pulsating "warning" augmentation) to stress to the personnel, that the equipment is in unsafe state.
- Signalization of the safety status can be either given in the form of sound 19 signalization (for example a sound siren) or in form of visual signalization 20 for example an optical siren. The signalization would be triggered in states p) or q) to warn the personnel about approaching or leaving the equipment in unsafe state. The signalization is preferably integrated in the Smart PPE 12.

Visualization of the Safe Procedure Guides can be triggered in states o), p), q) and r). The guides can be displayed on the head up display 17 or as augmentation in the 3D space 18 and it would contain step by step instructions for performing intended operation or maintenance task or step by step instruction for troubleshooting the envelope disturbance. The instruction would lead the personnel 2 and might be built in an interactive manner with the personnel confirming activities of each step are fulfilled.

As an additional option, the recording of the personnel actions trough the visual camera used for Equipment Distance Sensing (14) or Equipment Safety Status Sensing (15) can be triggered in states o), p), q) and r) for later use and review.

Information sharing between Part 1 and Part 2.

Optionally, a wireless connection and communication can be established between Personnel Safety System Part 1 and Part 2. It is not a mandatory feature of the system, both parts can work stand alone and one part operate without any connection to the other one, but such information sharing might improve the information quality for each part of the system in certain aspects.

As Part 1 of the system is tied to the equipment, it can have better information quality on the Equipment Safety Status and if shared to Part 2 of the System, this information would improve the Part 2 safety status calculations.

The Part 2 of the system can then have better information on the Intended Operation/Maintenance Task and this information if shared to Part 1 of the system can be used to improve the Part 1 status calculations.

While the invention has been illustrated and described in detail in the drawing and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In an example, the determination of the position of the person in the area outside of the outer envelope of the power distribution equipment comprises utilization by the processing unit of an image processing algorithm to identify a person.

In an example, the processing unit is configured to implement an image processing algorithm to process the vicinity sensor data to determine whether the person has at least one work item or not. The determination of the action can then comprise utilization of whether the person has the work item or not.

In an example, the at least one power distribution equipment sensor comprises one or more of limit switches, proximity sensors, position sensors, cameras.

In an example, the personnel safety state comprises one of: a) the equipment outer envelope is undisturbed and no person is detected, b) the equipment outer envelope is undisturbed and a person is detected within a distance X, c) the outer envelope is disturbed and no person is detected within the distance X, d) the outer envelope is disturbed and a person is detected to have just entered a vicinity of the power distribution equipment, e) the outer envelope is disturbed and a person is detected to be within the distance X, f) the outer envelope is disturbed and a person has been detected to have just left the vicinity of the power distribution equipment, g) the outer envelope is disturbed and no person is detected and at least one work item is detected within the distance X that was brought in by a person and the person is not detected for a duration<T.

In an example, the at least one determined action comprises one or more of: A) engagement of additional power distribution equipment protection in the case where the personnel safety state is d) or e); B) visualization of a safe indication in the case where the personnel safety state is a) or b), visualization of a danger indication in the case where the personnel safety state is c), d), e), or f); C) an indication on the floor of at least one safe zone in the area outside of the envelope in the case where the personnel safety state is c), d), e), or f) and/or an indication of personnel protection equipment to be worn in each zone in the area outside of the envelope in the case where the personnel safety state is c), d), e), or f), and/or an indication of a location of the disturbance in the outer envelope in the case where the personnel safety state is c), d), e), or f); D) signalization to warn of approaching or leaving the power distribution equipment that is in an unsafe state in the case where the personnel safety state is d) or f).

In a second aspect, there is provided a personal protection equipment system for power distribution equipment, the personal protection equipment system comprising:

personal protection equipment;

a processing unit;

at least one vicinity sensor integrated with or attached to the personal protection equipment;

at least one power distribution equipment sensor integrated with or attached to the personal protection equipment; and a user interface (16) integrated with or attached to the personal protection equipment.

The personal protection equipment is configured to be worn by a person. The at least one vicinity sensor is configured to acquire vicinity sensor data in an area outside of an outer envelope of a power distribution equipment, and provide the vicinity sensor data to the processing unit. The outer envelope comprises at least one door configured to permit access to an interior of the power distribution equipment and/or wherein the outer envelope comprises at least one cover configured to permit access to the interior of the power distribution equipment. The processing unit is configured to determine a position of a person wearing the personal protection equipment in the area outside of the outer envelope of the power distribution equipment, the determination comprising utilization of the vicinity sensor data. The at least one power distribution equipment sensor is configured to acquire status data of the outer envelope of the power distribution equipment and provide the status data to the processing unit. The processing unit is configured to utilize the status data to determine whether the power distribution equipment outer envelope is undisturbed where the at least one door and/or the at least one cover are correctly closed or whether the outer envelope is disturbed where one or more doors or one or more covers are open or not correctly closed or one or more covers are removed. The user interface is configured to enable the person to enter intended task information relating to the power distribution equipment and provide the task information to the processing unit.

The processing unit is configured to determine on the basis of the intended task information whether the power distribution equipment outer envelope is expected to be undisturbed where the at least one door and/or the at least one cover are correctly closed or whether the outer envelope is expected to be disturbed when one or more doors and/or one or more covers are open or one or more covers are removed. The processing unit is configured to determine a personnel safety state, the determination comprising utilization of the position of the person in the area outside of the outer envelope of the power distribution equipment and whether the power distribution equipment outer envelope is undisturbed or whether the outer envelope is disturbed and whether the power distribution equipment outer envelope is expected to be undisturbed or whether the outer envelope is expected to be disturbed. The processing unit is configured to determine at least one action comprising utilization of the personnel safety state.

In an example, the personal protection equipment comprises a head-up display and/or extended reality display system. The processing unit is configured display a representation of the power distribution equipment on the head-up display and/or the extended reality display comprising utilization of the vicinity sensor data.

In an example, the processing unit is configured to display information about the power distribution equipment on the head-up display and/or the extended reality display comprising utilization of the vicinity sensor data.

In an example, the information about the power distribution equipment comprises one or more of equipment type, equipment designation, short circuit current levels of the equipment, safe operating and troubleshooting instructions.

In an example, the processing unit is configure to implement an image processing algorithm to process the status data of the outer envelope of the power distribution equipment to determine one or more of: the at least one door is closed, the at least one door is correctly closed, the at least one cover is closed, the at least one cover is correctly closed, one or more doors are open, one or more covers are open, one or more doors are not correctly closed, one or more covers are not correctly closed, and one or more covers are removed.

In an example, the personnel safety state comprises one of: m) the equipment outer envelope is undisturbed and a person is not intending to operate or maintain the power distribution equipment, n) the equipment outer envelope is undisturbed and a person is detected within a distance Y and the intended operation is not intended to disturb the outer envelope, o) the equipment outer envelope is undisturbed and a person is detected within a distance Y and the intended operation is intended to disturb the outer envelope, p) the outer envelope is disturbed and a person is not intending to operate or maintain the power distribution equipment, q) the outer envelope is disturbed and a person is detected within a distance Y and the intended operation is not intended to disturb the outer envelope, r) the outer envelope is disturbed and a person is detected within a distance Y and the intended operation is intended to disturb the outer envelope.

In an example, the at least one determined action comprises one or more of: M) Visualization via the head-up display and/or the extended reality display system of a safe indication in the case where the personnel safety state is m) or n), visualization via the head-up display and/or the extended reality display system of a danger indication in the case where the personnel safety state is o), p), q) or r); N) Visualization via the head-up display and/or the extended reality display system an indication on the floor of at least one safe zone in the area outside of the envelope in the case where the personnel safety state is o), p), q), or r) and/or an indication of personnel protection equipment to be worn in each zone in the area outside of the envelope in the case where the personnel safety state is o), p), q), or r), and/or an indication of a location of the disturbance in the outer envelope in the case where the personnel safety state is o), p), q), or r); O) signalization to warn of approaching or leaving the power distribution equipment that is in an unsafe state in the case where the personnel safety state is p) or q); P) Visualization via the head-up display and/or the extended reality display system of instructions for performing an intended operation or maintenance task and/or instructions for troubleshooting an envelope disturbance in the case where the personnel safety state is o), p), q) or r); Q) recording of the vicinity sensor data and/or status data in the case where the personnel safety state is o), p), q) or r).

In a third aspect, a power distribution equipment personnel safety system, comprising:

- a power distribution equipment;
- personal protection equipment;
- a processing unit;
- at least one first vicinity sensor located on the power distribution equipment and/or at a fixed location separate from the power distribution equipment;
- at least one second vicinity sensor integrated with or attached to the personal protection equipment;
- at least one first power distribution equipment sensor located in the power distribution equipment and/or at a fixed location separate from the power distribution equipment, and wherein the at least one first power distribution equipment sensor comprises one or more of limit switches, proximity sensors, position sensors, cameras;
- at least one second power distribution equipment sensor integrated with or attached to the personal protection equipment; and
- a user interface integrated with or attached to the personal protection equipment.

The power distribution equipment comprises an outer envelope. The outer envelope comprises at least one door configured to permit access to an interior of the power distribution equipment and/or the outer envelope comprises at least one cover configured to permit access to the interior of the power distribution equipment. The personal protection equipment is configured to be worn by a person. The at least one first vicinity sensor is configured to acquire first vicinity sensor data in an area outside of the outer envelope of the power distribution equipment, and provide the first vicinity sensor data to the processing unit. The at least one second vicinity sensor is configured to acquire second vicinity sensor data in the area outside of the outer envelope of the power distribution equipment, and provide the first vicinity sensor data to the processing unit. The processing unit is configured to determine a position of the person in the area outside of the outer envelope of the power distribution equipment, the determination comprising utilization of the first vicinity sensor data and the second vicinity data. The at least one first power distribution equipment sensor is configured to acquire status data of the outer envelope of the power distribution equipment and provide the status data to the processing unit. The at least one second power distribution equipment sensor is configured to acquire status data of the outer envelope of the power distribution equipment and provide the status data to the processing unit.

The processing unit is configured to utilize the first status data and the second status data to determine whether the power distribution equipment outer envelope is undisturbed where the at least one door and/or the at least one cover are correctly closed or whether the outer envelope is disturbed where one or more doors or one or more covers are open or not correctly closed or one or more covers are removed. The user interface is configured to enable the person to enter intended task information relating to the power distribution equipment and provide the task information to the processing unit. The processing unit is configured to determine on the basis of the intended task information whether the power distribution equipment outer envelope is expected to be undisturbed where the at least one door and/or the at least one cover are correctly closed or whether the outer envelope is expected to be disturbed where one or more doors and/or one or more covers are open or one or more covers are removed. The processing unit is configured to determine a personnel safety state, the determination comprising utilization of the position of the person in the area outside of the outer envelope of the power distribution equipment and whether the power distribution equipment outer envelope is undisturbed or whether the outer envelope is disturbed and whether the power distribution equipment outer envelope is expected to be undisturbed or whether the outer envelope is expected to be disturbed. The processing unit is configured to determine at least one action comprising utilization of the personnel safety state.

In an example, the personal protection equipment comprises a head-up display and/or extended reality display system. The processing unit is configured display a representation of the power distribution equipment on the head-up display and/or the extended reality display comprising utilization of the vicinity sensor data.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A power distribution equipment personnel safety system, comprising:

a power distribution equipment;

a processing unit;

at least one vicinity sensor; and at least one power distribution equipment sensor;

wherein the power distribution equipment comprises an outer envelope, and wherein the outer envelope comprises at least one door configured to permit access to an interior of the power distribution equipment and/or wherein the outer envelope comprises at least one cover configured to permit access to the interior of the power distribution equipment;

wherein the at least one vicinity sensor is configured to acquire vicinity sensor data in an area outside of the outer envelope of the power distribution equipment, and provide the vicinity sensor data to the processing unit;

wherein the processing unit is configured to determine a position of a person in the area outside of the outer envelope of the power distribution equipment, the determination comprising utilization of the vicinity sensor data;

wherein the at least one power distribution equipment sensor is configured to acquire status data of the outer envelope of the power distribution equipment and provide the status data to the processing unit;

wherein the processing unit is configured to utilize the status data to determine whether the power distribution equipment outer envelope is undisturbed where the at least one door and/or the at least one cover are correctly closed or whether the outer envelope is disturbed where one or more doors or one or more covers are open or not correctly closed or one or more covers are removed;

wherein the processing unit is configured to determine a personnel safety state, the determination comprising utilization of the position of the person in the area outside of the outer envelope of the power distribution equipment and whether the power distribution equipment outer envelope is undisturbed or whether the outer envelope is disturbed; and wherein the processing unit is configured to determine at least one action comprising utilization of the personnel safety state.

2. The system according to claim 1, wherein the determination of the position of the person in the area outside of the outer envelope of the power distribution equipment comprises utilization by the processing unit of an image processing algorithm to identify a person.

3. The system according to claim 1, wherein the processing unit is configured to implement an image processing algorithm to process the vicinity sensor data to determine whether the person has at least one work item or not, and wherein the determination of the action comprises utilization of whether the person has the work item or not.

4. The system according to claim 1, wherein the at least one power distribution equipment sensor comprises one or more of limit switches, proximity sensors, position sensors, cameras.

5. The system according to claim 1, wherein the personnel safety state comprises one of:

a) the equipment outer envelope is undisturbed and no person is detected, b) the equipment outer envelope is undisturbed and a person is detected within a distance X, c) the outer envelope is disturbed and no person is detected within the distance X, d) the outer envelope is disturbed and a person is detected to have just entered a vicinity of the power distribution equipment, e) the outer envelope is disturbed and a person is detected to be within the distance X, f) the outer envelope is disturbed and a person has been detected to have just left the vicinity of the power distribution equipment, g) the outer envelope is disturbed and no person is detected and at least one work item is detected within the distance X that was brought in by a person and the person is not detected for a duration<T.

6. The system according to claim 5, wherein the at least one determined action comprises one or more of:

A) engagement of additional power distribution equipment protection in the case where the personnel safety state is d) or e);

B) visualization of a safe indication in the case where the personnel safety state is a) or b), visualization of a danger indication in the case where the personnel safety state is c), d), e), or f);

C) an indication on the floor of at least one safe zone in the area outside of the envelope in the case where the personnel safety state is c), d), e), or f) and/or an indication of personnel protection equipment to be worn in each zone in the area outside of the envelope in the case where the personnel safety state is c), d), e), or f), and/or an indication of a location of the disturbance in the outer envelope in the case where the personnel safety state is c), d), e), or f);

D) signalization to warn of approaching or leaving the power distribution equipment that is in an unsafe state in the case where the personnel safety state is d) or f).

7. A personal protection equipment system for power distribution equipment, the personal protection equipment system comprising:

personal protection equipment;

a processing unit;

at least one vicinity sensor integrated with or attached to the personal protection equipment;

at least one power distribution equipment sensor integrated with or attached to the personal protection equipment; and a user interface integrated with or attached to the personal protection equipment;

wherein the personal protection equipment is configured to be worn by a person;

wherein the at least one vicinity sensor is configured to acquire vicinity sensor data in an area outside of an outer envelope of a power distribution equipment, and provide the vicinity sensor data to the processing unit, wherein the outer envelope comprises at least one door configured to permit access to an interior of the power distribution equipment and/or wherein the outer envelope comprises at least one cover configured to permit access to the interior of the power distribution equipment;

wherein the processing unit is configured to determine a position of a person wearing the personal protection equipment in the area outside of the outer envelope of the power distribution equipment, the determination comprising utilization of the vicinity sensor data;

wherein the at least one power distribution equipment sensor is configured to acquire status data of the outer envelope of the power distribution equipment and provide the status data to the processing unit;

wherein the processing unit is configured to utilize the status data to determine whether the power distribution equipment outer envelope is undisturbed where the at least one door and/or the at least one cover are correctly closed or whether the outer envelope is disturbed where one or more doors or one or more covers are open or not correctly closed or one or more covers are removed;

wherein the user interface is configured to enable the person to enter intended task information relating to the power distribution equipment and provide the task information to the processing unit;

wherein the processing unit is configured to determine on the basis of the intended task information whether the power distribution equipment outer envelope is expected to be undisturbed where the at least one door and/or the at least one cover are correctly closed or whether the outer envelope is expected to be disturbed where one or more doors and/or one or more covers are open or one or more covers are removed;

wherein the processing unit is configured to determine a personnel safety state, the determination comprising utilization of the position of the person in the area outside of the outer envelope of the power distribution equipment and whether the power distribution equipment outer envelope is undisturbed or whether the outer envelope is disturbed and whether the power distribution equipment outer envelope is expected to be undisturbed or whether the outer envelope is expected to be disturbed; and wherein the processing unit is configured to determine at least one action comprising utilization of the personnel safety state.

8. The system according to claim 7, wherein the personal protection equipment comprises a head-up display and/or extended reality display system, and wherein the processing unit is configured to display a representation of the power distribution equipment on the head-up display and/or the extended reality display comprising utilization of the vicinity sensor data.

9. The system according to claim 8, wherein the personnel safety state comprises one of:

m) the equipment outer envelope is undisturbed and a person is not intending to operate or maintain the power distribution equipment, n) the equipment outer envelope is undisturbed and a person is detected within a distance Y and the intended operation is not intended to disturb the outer envelope, o) the equipment outer envelope is undisturbed and a person is detected within a distance Y and the intended operation is intended to disturb the outer envelope, p) the outer envelope is disturbed and a person is not intending to operate or maintain the power distribution equipment, q) the outer envelope is disturbed and a person is detected within a distance Y and the intended operation is not intended to disturb the outer envelope, r) the outer envelope is disturbed and a person is detected within a distance Y and the intended operation is intended to disturb the outer envelope.

10. The system according to claim 9, wherein the at least one determined action comprises one or more of:

M) Visualization via the head-up display and/or the extended reality display system of a safe indication in the case where the personnel safety state is m) or n), visualization via the head-up display and/or the extended reality display system of a danger indication in the case where the personnel safety state is o), p), q) or r);

N) Visualization via the head-up display and/or the extended reality display system an indication on the floor of at least one safe zone in the area outside of the envelope in the case where the personnel safety state is o), p), q), or r) and/or an indication of personnel protection equipment to be worn in each zone in the area outside of the envelope in the case where the personnel safety state is o), p), q), or r), and/or an indication of a location of the disturbance in the outer envelope in the case where the personnel safety state is o), p), q), or r);

O) signalization to warn of approaching or leaving the power distribution equipment that is in an unsafe state in the case where the personnel safety state is p) or q);

P) Visualization via the head-up display and/or the extended reality display system of instructions for performing an intended operation or maintenance task and/or instructions for troubleshooting an envelope disturbance in the case where the personnel safety state is o), p), q) or r);

Q) recording of the vicinity sensor data and/or status data in the case where the personnel safety state is o), p), q) or r).

11. The system according to claim 7, wherein the personal protection equipment comprises a head-up display and/or extended reality display system and wherein the processing unit is configured to display information about the power distribution equipment on the head-up display and/or the extended reality display comprising utilization of the vicinity sensor data.

12. The system according to claim 11, wherein the information about the power distribution equipment comprises one or more of equipment type, equipment designation, short circuit current levels of the equipment, safe operating and troubleshooting instructions.

13. The system according to claim 7, wherein the processing unit is configure to implement an image processing algorithm to process the status data of the outer envelope of the power distribution equipment to determine one or more of: the at least one door is closed, the at least one door is correctly closed, the at least one cover is closed, the at least one cover is correctly closed, one or more doors are open, one or more covers are open, one or more doors are not correctly closed, one or more covers are not correctly closed, and one or more covers are removed.

14. A power distribution equipment personnel safety system, comprising:

a power distribution equipment;

personal protection equipment;

a processing unit;

at least one first vicinity sensor located on the power distribution equipment and/or at a fixed location separate from the power distribution equipment;

at least one second vicinity sensor integrated with or attached to the personal protection equipment;

at least one first power distribution equipment sensor located in the power distribution equipment and/or at a fixed location separate from the power distribution equipment, and wherein the at least one first power distribution equipment sensor comprises one or more of limit switches, proximity sensors, position sensors, cameras;

at least one second power distribution equipment sensor integrated with or attached to the personal protection equipment; and a user interface integrated with or attached to the personal protection equipment;

wherein the power distribution equipment comprises an outer envelope, and wherein the outer envelope comprises at least one door configured to permit access to an interior of the power distribution equipment and/or wherein the outer envelope comprises at least one cover configured to permit access to the interior of the power distribution equipment;

wherein the personal protection equipment is configured to be worn by a person;

wherein the at least one first vicinity sensor is configured to acquire first vicinity sensor data in an area outside of the outer envelope of the power distribution equipment, and provide the first vicinity sensor data to the processing unit;

wherein the at least one second vicinity sensor is configured to acquire second vicinity sensor data in the area outside of the outer envelope of the power distribution equipment, and provide the first vicinity sensor data to the processing unit;

wherein the processing unit is configured to determine a position of the person in the area outside of the outer envelope of the power distribution equipment, the determination comprising utilization of the first vicinity sensor data and the second vicinity data;

wherein the at least one first power distribution equipment sensor is configured to acquire status data of the outer envelope of the power distribution equipment and provide the status data to the processing unit;

wherein the at least one second power distribution equipment sensor is configured to acquire status data of the outer envelope of the power distribution equipment and provide the status data to the processing unit;

wherein the processing unit is configured to utilize the first status data and the second status data to determine whether the power distribution equipment outer envelope is undisturbed where the at least one door and/or the at least one cover are correctly closed or whether the outer envelope is disturbed where one or more doors or one or more covers are open or not correctly closed or one or more covers are removed;

wherein the user interface is configured to enable the person to enter intended task information relating to the power distribution equipment and provide the task information to the processing unit;

wherein the processing unit is configured to determine on the basis of the intended task information whether the power distribution equipment outer envelope is expected to be undisturbed where the at least one door and/or the at least one cover are correctly closed or whether the outer envelope is expected to be disturbed where one or more doors and/or one or more covers are open or one or more covers are removed;

wherein the processing unit is configured to determine a personnel safety state, the determination comprising utilization of the position of the person in the area outside of the outer envelope of the power distribution equipment and whether the power distribution equipment outer envelope is undisturbed or whether the outer envelope is disturbed and whether the power distribution equipment outer envelope is expected to be undisturbed or whether the outer envelope is expected to be disturbed; and wherein the processing unit is configured to determine at least one action comprising utilization of the personnel safety state.

15. The system according to claim 14, wherein the personal protection equipment comprises a head-up display and/or extended reality display system, and wherein the processing unit is configured display a representation of the power distribution equipment on the head-up display and/or the extended reality display comprising utilization of the vicinity sensor data.

* * * * *